US012690571B2

(12) United States Patent
Helfrich et al.

(10) Patent No.: US 12,690,571 B2
(45) Date of Patent: Jul. 28, 2026

(54) SYSTEM FOR AN IOT DEVICE FOR TRACKING HEALTH AND LOCATION OF LIVESTOCK

(71) Applicant: Wandering Shepherd Technology Ltd., Alberta (CA)

(72) Inventors: Neil Charles Helfrich, Alberta (CA); Sheldon Troy Charles Archibald, Alberta (CA)

( * ) Notice: Subject to any disclaimer, the term of this patent is extended or adjusted under 35 U.S.C. 154(b) by 301 days.

(21) Appl. No.: 18/734,465

(22) Filed: Jun. 5, 2024

(65) Prior Publication Data

US 2024/0324560 A1    Oct. 3, 2024

(51) Int. Cl.
| | |
|---|---|
| *A01K 29/00* | (2006.01) |
| *A61D 13/00* | (2006.01) |
| *A61D 99/00* | (2006.01) |

(52) U.S. Cl.
CPC ............ *A01K 29/005* (2013.01); *A61D 13/00* (2013.01); *A61D 99/00* (2013.01)

(58) Field of Classification Search
CPC .. A01K 29/005; A01K 29/007; A01K 11/008; A01K 11/006; A01K 11/007; A61D 13/00; A61D 99/00; A61B 5/01; A61B 5/07; A61B 5/0031; A61B 2503/40; A61B 2562/162
See application file for complete search history.

(56) References Cited

U.S. PATENT DOCUMENTS

| | | | | |
|---|---|---|---|---|
| 7,705,736 B1 * | 4/2010 | Kedziora | ............. | A01K 27/009 |
| | | | | 340/573.3 |
| 2009/0182207 A1 * | 7/2009 | Riskey | ................. | A61B 5/1124 |
| | | | | 600/587 |
| 2009/0187392 A1 * | 7/2009 | Riskey | ................. | A61B 5/4238 |
| | | | | 703/11 |
| 2012/0277550 A1 * | 11/2012 | Rosenkranz | ......... | A01K 11/007 |
| | | | | 600/302 |
| 2014/0336524 A1 * | 11/2014 | Stewart | ................ | A61B 5/0024 |
| | | | | 600/549 |
| 2016/0360994 A1 * | 12/2016 | Rettedal | ............. | A61B 5/02055 |
| 2019/0059335 A1 * | 2/2019 | Crider, Jr. | ............ | A01K 29/005 |
| 2019/0290133 A1 * | 9/2019 | Crider | .................... | G01K 3/005 |
| 2019/0336041 A1 * | 11/2019 | Geissler | .............. | A01K 29/005 |
| 2021/0268244 A1 * | 9/2021 | Niichel | ................ | A61K 9/0053 |

(Continued)

FOREIGN PATENT DOCUMENTS

WO    WO-2022125092 A1 *  6/2022    .............. A61B 5/01

*Primary Examiner* — Trinh T Nguyen

(57) ABSTRACT

The invention discloses a livestock monitoring system utilizing firmware and computer-readable instructions for IoT devices. It tracks the health and location of livestock by monitoring their temperature and adjusting the frequency of data transmission accordingly. When the temperature is within normal ranges, data is sent once per hour; for slightly elevated temperatures, data transmission increases to every 30 minutes, and for high temperatures, it increases to every 15 minutes, reverting back to hourly transmissions when temperatures normalize. The system includes features such as activation via magnet, SMS/email notifications, reprogramming over-the-air, and alerts for temperature fluctuations. Additionally, it incorporates facial recognition for livestock identification and disease traceability to locate animals within a specified distance of a diseased individual.

16 Claims, 5 Drawing Sheets

(56) References Cited

U.S. PATENT DOCUMENTS

| 2021/0338165 A1* | 11/2021 | Kim | .......................... | A61B 5/01 |
| 2022/0133175 A1* | 5/2022 | Kim | ..................... | A01K 11/007 |
| | | | | 600/301 |

* cited by examiner

SYSTEM FOR AN IOT DEVICE FOR TRACKING HEALTH AND LOCATION OF LIVESTOCK

FIELD OF THE INVENTION

The present invention relates to the field of livestock management technology. Specifically, the invention pertains to a firmware system for IoT devices used in tracking the health and location of livestock.

BACKGROUND OF THE INVENTION

As the global population continues to rise, the demand for food production is escalating rapidly, necessitating a corresponding increase in livestock production. To meet this growing demand and ensure the availability of healthy livestock, there is an imperative need to monitor their health status effectively. Traditionally, efforts have been made to monitor livestock characteristics and detect their health status by attaching or implanting health sensor devices onto or within the bodies of individual animals. These health sensor devices collect biometric data from the animals, which is then analyzed to provide insights into their health condition.

US 20090182207A1 discloses an ingestible bolus configured to be maintained in a stomach of an animal. Ballast weight and a power source may be disposed therein. The ballast weight may be configured to cause the bolus to be maintained in contact with a stomach wall of the animal when disposed therein. The bolus may comprise sensors to measure one or more animal characteristics, a transmitter in wireless communication with an animal monitoring system, a memory unit to store measured characteristics and bolus configuration data, and processor to control the operation of the bolus components. The transmitter may be in communication with an antenna. The antenna may be separated from the sensors, processors, and transmitter to prevent and/or reduce interference and/or coupling therebetween. The sensors are programmed to sample/poll to measure the corresponding animal characteristics of respective animal of livestock at a preset sampling/polling rate and update using wireless communication.

US20090187392A1 provides an ingestible bolus may be disposed within the stomach of an animal. The bolus may comprise one or more sensors to monitor one or more internal and/or external animal characteristics. The bolus may comprise a data transmitter in wireless communication with a base station. The base station may receive messages from the bolus comprising one or more measured animal characteristics. The base station may comprise a process to monitor the animal and/or be in communication with a process to monitor the animal. The process limits to building an animal profile based upon the observed characteristics of the animal without taking into consideration real time variation in animal characteristic, the characteristics of other animals in a group associated with the animal, and/or characteristics associated with the breed and/or sex of the animal. Based on this profile, the process may detect a change in a health condition of the animal. Such heath conditions may include, but are not limited to, an estrus condition in the animal, off-feed condition, a nominal condition, the animal leaving an enclosure, or the like.

WO2022220317A1 discloses an ingestible health sensor device configured to stay in the stomach of an animal may be formed of a substantially cylindrical housing shell. A ballast weight and a power source may be disposed therein.

The ballast weight may be configured to cause the health sensor device to remain in contact with the gastric wall of the animal when the health sensor device is disposed in the animal's stomach. The health sensor device may comprise: a sensor which measures a plurality of animal characteristics; a transmitter which wirelessly communicates with an animal monitoring system; a memory unit for storing the measured characteristics and health sensor device configuration data; and a processor which controls the operation of the components of the health sensor device. The transmitter may communicate with an antenna, and the antenna may be formed as a trace on an antenna circuit board such as a printed circuit board (PCB). The antenna may be separated from the sensor, the processor, and the transmitter to prevent and/or reduce interference and/or coupling therebetween. The invention is restricted by the limitations of the method and system by the disclosure for measuring only the digestibility in the rumen of a ruminant of the animal by withdrawing gastric juices from various locations in the rumen.

Livestock management is a critical component of agricultural practices worldwide, serving as a primary source of food and livelihood for countless communities. However, traditional methods of monitoring livestock health and location have faced significant limitations, hindering optimal production and management outcomes.

One prominent issue with existing livestock monitoring technologies is their inability to adapt to the dynamic health conditions of individual animals. Conventional approaches often rely on static monitoring systems or periodic manual checks, which fail to provide real-time insights into the health status of livestock. This delay in detection can lead to missed opportunities for timely intervention, resulting in decreased productivity and potential health risks for the animals.

Moreover, the complexity and invasiveness of current health monitoring techniques present additional challenges. Attachment or implantation of health sensor devices onto or within the bodies of livestock can be cumbersome, costly, and potentially harmful to the animals. Furthermore, the data collected from these devices may be limited in scope or accuracy, leading to incomplete or unreliable health assessments.

Furthermore, the escalating global demand for livestock products underscores the urgency for more efficient and effective monitoring solutions. With population growth and increasing food requirements, there is a pressing need for innovative technologies that can enhance livestock management practices, improve production efficiency, and ensure the health and well-being of livestock population.

In light of these challenges, there exists a clear need for advancements in livestock monitoring technologies that offer real-time, non-invasive, and adaptable solutions to address the evolving demands of modern agriculture.

SUMMARY OF THE INVENTION

To address the foregoing problems, in whole or in part, and/or other problems that may have been observed by persons skilled in the art, the present disclosure provides compositions and methods as described by way of example as set forth below.

A principal object of the invention is to improve the monitoring of livestock health and location by employing an IoT device equipped with innovative firmware.

Another object of the invention is to dynamically adjust the frequency of data transmission based on the temperature of the livestock, ensuring timely and efficient data delivery.

Another object of the invention is to provide alerts and notifications to livestock managers regarding temperature fluctuations and potential health concerns.

Another object of the invention is to enhance overall livestock management practices by providing accurate, real-time data on temperature, health status, and location, facilitating better decision-making and care.

In view of the foregoing, the present invention provides a firmware system designed for an IoT device used in tracking the health and location of livestock. This system entails the monitoring of the temperature of the livestock and dynamically adjusting the frequency of data transmission based on the recorded temperature. Specifically, when the temperature falls within the normal range, data transmission occurs once per hour. In instances where the temperature exceeds the normal range, data is transmitted every 30 minutes. Similarly, when the temperature reaches the high range, data transmission frequency increases to every 15 minutes. The system automatically reverts to the default transmission frequency of once per hour when the temperature returns to the normal range.

In an aspect of the invention, the IoT device further comprises a magnet used to activate the IoT device.

In an aspect of the invention, the IoT device sends an SMS and/or email notification to the user upon activation.

In an aspect of the invention, the IoT device is inserted into the livestock using a balling gun.

In an aspect of the invention, the frequency of data transmission is reprogrammable over-the-air.

In an aspect, alerts are generated when the temperature transitions between normal and slight high, slight high and high, or pregnancy and normal ranges.

In another embodiment, the invention comprises a computer-readable non-transitory storage medium contains instructions executable by a processor of an IoT device configured to track the health and location of livestock. The instructions involve monitoring the temperature of the livestock and adjusting the frequency of data transmission based on the temperature. Specifically, when the temperature is in the normal range, data is sent once per hour; when the temperature is above the normal range, data is sent every 30 minutes; when the temperature is in the high range, data is sent every 15 minutes. The system automatically reverts to sending data once per hour when the temperature returns to the normal range.

In another embodiment, the invention provides a method for monitoring the health and location of livestock using an IoT device equipped with firmware involves several steps. Firstly, it includes monitoring the temperature of the livestock. Then, based on the recorded temperature, the method adjusts the frequency of data transmission accordingly. Specifically, when the temperature falls within the normal range, data is sent once per hour. However, if the temperature exceeds the normal range, data transmission occurs every 30 minutes. Furthermore, when the temperature reaches the high range, data transmission frequency increases to every 15 minutes. The method seamlessly reverts to sending data once per hour as soon as the temperature returns to the normal range.

Additional features of the invention will be or will become apparent to one with skill in the art upon examination of the following figures and detailed description. It is intended that all such additional features and advantages be included within this description, be within the scope of the invention, and be protected by the accompanying claims.

BRIEF DESCRIPTION OF THE DRAWINGS

Figure 1:
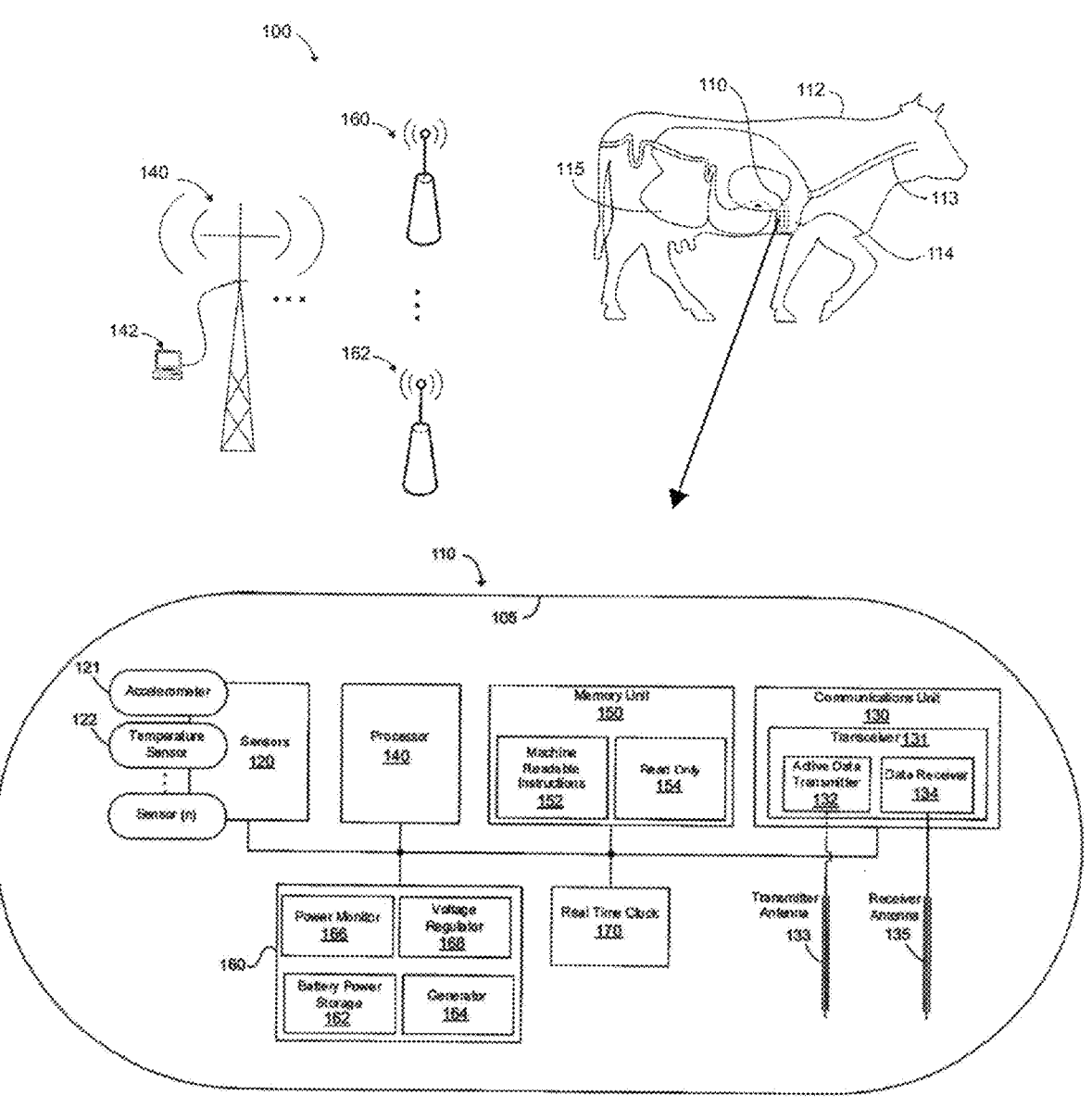
Figure 2:
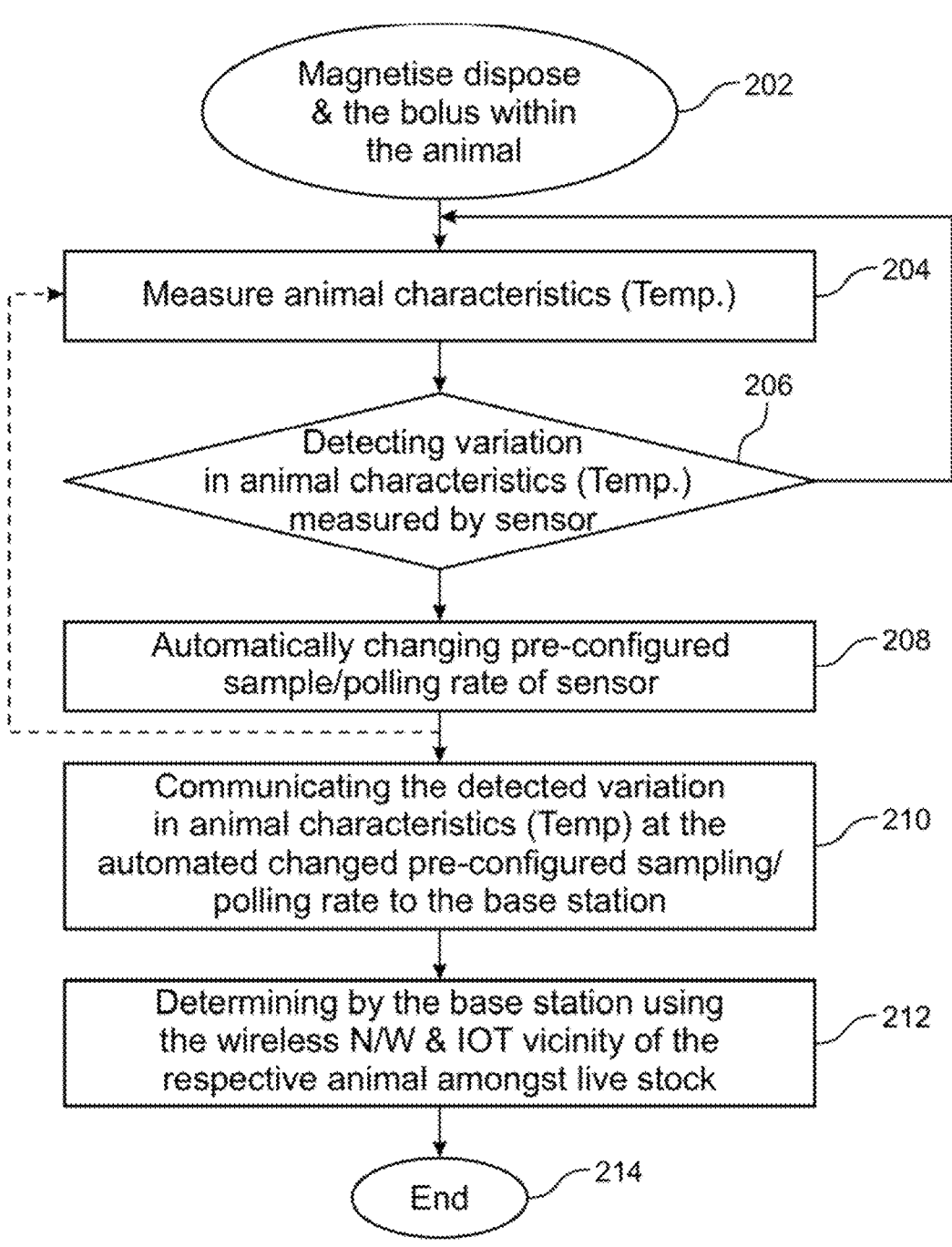
Figure 3:
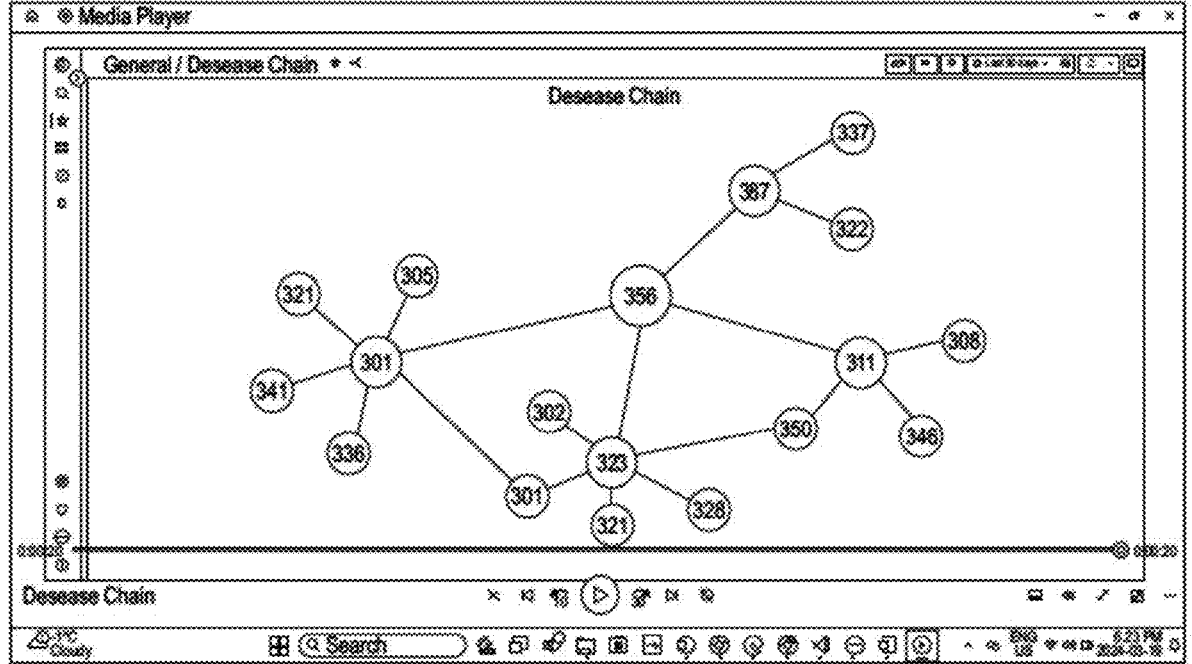

Having thus described the subject matter of the present invention in general terms, reference will now be made to the accompanying drawings, which are not necessarily drawn to scale, and wherein:

FIG. 1 illustrates an embodiment of a system for adaptive monitoring of an animal;

FIG. 2 illustrates an embodiment of a method flowchart for adaptive monitoring of the animal employing an ingestible bolus as illustrated in FIG. 1;

FIG. 3 illustrates a screen shot of a software system for determining vicinity of an animal amongst livestock in accordance with an embodiment of as system for adaptive monitoring of an animal amongst the livestock.

Figure 4:
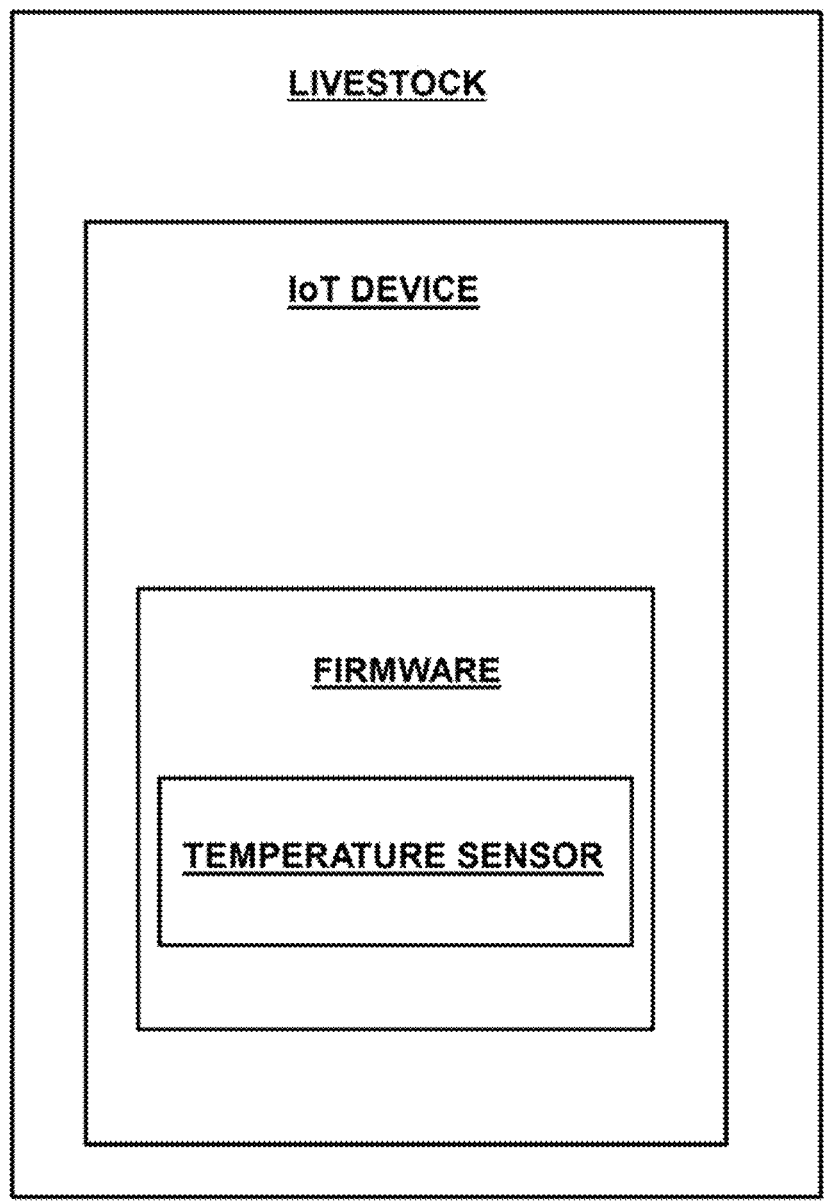

FIG. 4 illustrates a block diagram of a firmware system for an IoT device for tracking health and location of livestock.

Figure 5:
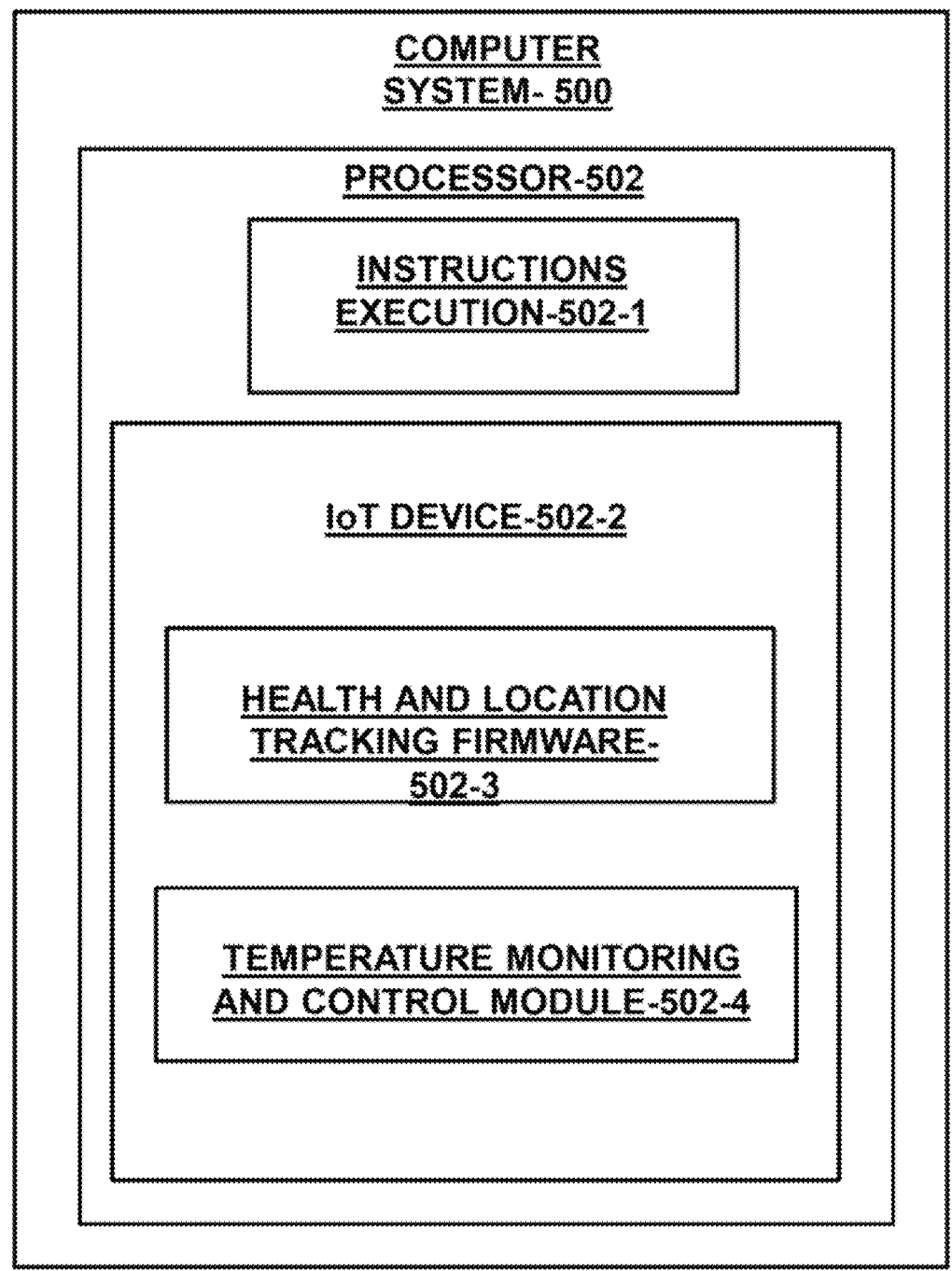

FIG. 5 illustrates a block diagram of a computer system for executing adaptive monitoring of the livestock.

Skilled artisans will appreciate that elements in the drawings are illustrated for simplicity and may not have necessarily been drawn to scale. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having the benefit of the description herein.

DETAILED DESCRIPTION OF THE INVENTION

The subject matter of the present invention now will be described more fully hereinafter with reference to the accompanying drawings, in which some, but not all embodiments of the subject matter of the present invention are shown. Like numbers refer to like elements throughout. The subject matter of the present invention may be embodied in many different forms and should not be construed as limited to the embodiments set forth herein; rather, these embodiments are provided so that this disclosure will satisfy applicable legal requirements. Indeed, many modifications and other embodiments of the subject matter of the present invention set forth herein will come to mind to one skilled in the art to which the subject matter of the present invention pertains having the benefit of the teachings presented in the foregoing descriptions and the associated drawings. All illustrations of the drawings are for the purpose of describing selected versions of the present invention and are not intended to limit the scope of the present invention. Therefore, it is to be understood that the subject matter of the present invention is not to be limited to the specific embodiments disclosed and that modifications and other embodiments are intended to be included within the scope of the appended claims.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and example of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one", but does not exclude a plurality unless the contextual use dictates otherwise. When used herein to join a list of items, "or" denotes "at least one of the items", but does not exclude a plurality of items of the list. Finally, when used herein to join a list of items, "and" denotes "all of the items of the list".

The present invention discloses an innovative approach to livestock monitoring through a sophisticated firmware system designed specifically for IoT devices. This system efficiently tracks the health and location of livestock, addressing long-standing challenges associated with traditional monitoring methods. By utilizing temperature data, the invention dynamically adjusts the frequency of data transmission, ensuring timely and effective communication of essential information.

The invention's adaptable nature enables it to respond promptly to fluctuations in the health conditions of livestock. When the temperature falls within the normal range, data transmission occurs once per hour, establishing a reliable baseline for monitoring. However, as temperature variations arise, the system adapts in real-time, increasing the frequency of data transmission to every 30 minutes for slightly elevated temperatures and every 15 minutes for high temperatures. This responsive approach ensures that livestock managers receive timely updates on their animals' health status, enabling proactive intervention when necessary.

In addition to its adaptive monitoring capabilities, the invention introduces several innovative features to enhance livestock management practices. With the convenience of activating the IoT device using a magnet and receiving instant notifications via SMS or email, livestock managers have seamless control and monitoring capabilities at their disposal. Furthermore, the system offers over-the-air reprogramming, allowing for easy updates and ensuring optimal performance over time.

Beyond its temperature-based monitoring functionality, the invention incorporates advanced features such as facial recognition for livestock identification and disease traceability to locate nearby animals in case of health concerns. By integrating these cutting-edge technologies, the invention represents a comprehensive solution for modern livestock management, fostering improved productivity, health outcomes, and overall efficiency in agricultural practices.

In accordance with an embodiment of the present invention, FIG. 1 illustrates a schematic diagram 100 depicting one version of a system designed for monitoring the characteristics of one or more animals in real-time. The system, as shown in FIG. 1, includes an ingestible bolus 110 that is placed within the stomach 114 of an animal 112 (referred to as livestock) to gauge various aspects of the animal's health. This ingestible bolus 110 is equipped with multiple sensors 120 to measure the animal's characteristics at a predetermined sampling or polling frequency. Additionally, there is a processing unit 140 linked to the sensors 120, a memory unit 150 connected to the processing unit 140, and a real-time clock unit 170. Moreover, there's a transceiver unit 131 tied to the processing unit 140, along with multiple antenna units 133 and 135 communicating with the transceiver unit 131. Furthermore, there are multiple wireless transponders 160 and 162 linked to the ingestible bolus 110, as well as a wireless network 140 with a base station 142 in communication with the numerous wireless transponders 160 and 162.

At least one 122 sensor from the group of sensors 120 detects or identifies a change in the corresponding characteristic of the animal 112. Upon detecting such variation, the processing unit 140, utilizing the memory unit 150 and the real-time clock unit 170, automatically adjusts the pre-set sampling or polling frequency of the identified sensor. This adjustment is made in real-time, depending on the rate of change observed in the characteristic of the animal 112. The transceiver unit 131 is set up to transmit these automatic adjustments in the pre-set sampling or polling frequency of the identified sensor in real-time. This transmission is facilitated through the array of antennas 133 and 135 to the plurality of wireless transponders 160 and 162. Additionally, the wireless transponders 160 and 162 are configured to update the detected variations in the corresponding animal characteristic to the wireless network 140 and the base station 142. Furthermore, these wireless transponders are also programmed to relay the detected variations in the corresponding animal characteristic, based on the changes in the pre-set sampling or polling frequency, to an extraterrestrial network.

Upon receiving the detected variation in the corresponding characteristic of the animal 112, the base station 142 is additionally programmed to ascertain the proximity of the animal 112 within the livestock. This determination is made possible by utilizing one or more of the plurality of wireless transponders 160, 162 and the wireless network 140. Moreover, the base station 142, leveraging the wireless network 140 and one or more of the plurality of wireless transponders 160, 162, is configured to update the wireless transmission of a set of machine-executable sequential instructions to the ingestible bolus 110. This update enables adaptive animal monitoring, ensuring the ingestible bolus 110 remains in sync with the evolving monitoring requirements seamlessly.

In one embodiment of the current disclosure, illustrated in FIG. 1, an ingestible bolus 110 is positioned within the anatomy of an animal 112. This ingestible bolus 110 is designed to be ingested through the esophagus 113 of a ruminant animal, such as a bovine. Specifically tailored for this purpose, the ingestible bolus 110 possesses dimensions and density that allow it to reside comfortably within the stomach of a bovine. This ensures that the bolus remains securely in place and is not expelled from the animal's reticulum 115 and/or rumen 114.

In FIG. 1, the presence of ingestible bolus 110 is depicted within the rumen 114 of a ruminant animal. This ingestible bolus 110 is adaptable to be situated within any stomach or stomach chamber capable of accommodating it. Designed for durability, the ingestible bolus 110 can persist within the animal's reticulum 115 and/or rumen 114 for the entirety of its lifespan.

Alternatively, in a different embodiment, a bolus may be administered via injection, implantation beneath the skin, or other means within the animal's body.

The ingestible bolus 110 incorporates a multitude of sensors 120 to detect various animal characteristics. In this setup, the ingestible bolus 110 wirelessly transmits data pertaining to monitored animal characteristics to the base station 142. These monitored characteristics encompass physiological aspects such as temperature, stomach pH, blood pH, heart rate, respiration, stomach contractions, as well as non-physiological factors like animal movement and motion activity, and animal location.

The base station 142 comprises a computing device that is communicatively linked to the base station 142. This computing device can be of any type, either general-purpose or tailored to specific functions, as known in the field.

For wireless communication, the ingestible bolus 110 employs a wireless transmitter and/or receiver, functioning typically at 900 MHz or another suitable radio frequency. In certain scenarios, this wireless communication may be two-way, allowing the ingestible bolus 110 to both transmit and receive data from the base station 142.

Given that animals in livestock may traverse expansive areas such as feed lots, dairies, ranges, or enclosures, the distance between the base station 142 and the ingestible bolus 110 could exceed the wireless communication range of the ingestible bolus 110. In such instances, a plurality of wireless transponders 160, 162 may be deployed to extend the communication range of the ingestible bolus 110 to the base station 142. These transponders receive wireless transmissions from the ingestible bolus 110 and retransmit them at a higher power or different frequency to facilitate reception by the base station 142. Similarly, transmissions from the base station 142 to the ingestible bolus 110 can be relayed by the transponders at higher power to ensure reception by the ingestible bolus 110.

The wireless communication attributes of the ingestible bolus 110 between the base station 142 and/or the plurality of transponders 160, 162 may enable the base station 142 to determine location information concerning the respective animal 112. When employing a single base station 142, various methods, including assessing wireless signal strength or timestamp information in the wireless message, may be used to determine the animal's distance from the base station 142.

As depicted in FIG. 1, the system may involve the base station 142 and/or the plurality of transponders 160, 162. In such scenarios, the base station 142 may ascertain location information pertaining to the animal through established wireless communications triangulation methods.

FIG. 2 presents an embodiment of a process flowchart 200 detailing the adaptive monitoring procedure for animals utilizing an ingestible bolus, as depicted in FIG. 1. The process initiates at step 202 by magnetizing and positioning the ingestible bolus within the animal, as described in FIG. 1. Subsequently, step 204 involves the measurement of a corresponding characteristic of the livestock animal using one or more sensors housed within the ingestible bolus.

Progressing to step 206, if a sensor identifies a deviation in the measured animal characteristic beyond the preset range, the process advances. For instance, if the sensor detects a fluctuation in the animal's temperature, denoting either an increase or decrease, the measurement is recorded. The process then either proceeds to step 208 or loops back to step 204, depending on whether the measured temperature falls within the preset range indicative of the animal's normal physiological state.

In the event of a detected temperature variation at step 206, the process proceeds to step 208, where the preset sampling/polling rate of the sensor is automatically adjusted to reflect the temperature variation. Concurrently, the process awaits the new sample of animal characteristic at the altered sampling/polling rate, as indicated in step 210. Following the automated adjustment, the detected temperature variation is communicated to the base station 142 in step 212 using IoT-enabled devices associated with the wireless transponders 160, 162 and the wireless network 140.

Lastly, at step 214, the base station 142, leveraging the wireless network 140 and IoT-enabled devices 160, 162, determines the proximity of the respective animal within the livestock population. This iterative process enables the continuous monitoring and adaptive response to variations in animal characteristics, facilitating proactive intervention and improved livestock management practices.

FIG. 3 showcases a screenshot of a software system 300 designed for determining the proximity of an animal 301 within a population of livestock (302, 311, 320, 321 . . . ) as part of an embodiment of a system and method for adaptive monitoring of animals within the livestock. The base station 142 and/or computing device may be monitored by and/or in communication with an entity known as the animal manager. This animal manager can encompass individuals, machinery, or processes involved in overseeing one or more animals. Responsible for the animals monitored by the disclosed systems and methods, the animal manager may oversee various automated systems such as feeding, heating, and cooling mechanisms.

Furthermore, the animal manager may comprise human personnel and/or veterinary professionals, ensuring comprehensive oversight and care for the animals. The base station 142 and/or computing system can be configured by or interact with the animal manager to monitor and respond to changes in animal health conditions. This collaboration between the base station 142, computing system, and the animal manager facilitates effective management of livestock health and ensures timely interventions when required.

In accordance with an embodiment of the present invention, FIG. 4 illustrates a block diagram of a firmware system for an IoT device for tracking health and location of livestock. The depicted system block diagram illustrates a firmware system integrated within an IoT device designed for monitoring the health and location of livestock. At the core of this system lies the firmware, responsible for orchestrating the monitoring process. A crucial component of the firmware is the inclusion of a temperature sensor, facilitating the continuous monitoring of the livestock's temperature. This temperature data serves as the basis for dynamically adjusting the frequency of data transmission. When the temperature falls within the normal range, data is transmitted once per hour, ensuring regular updates while conserving resources. Should the temperature exceed the normal range, the transmission frequency is intensified, with data sent every 30 minutes. Similarly, in high-temperature scenarios, data is transmitted every 15 minutes to provide more frequent updates during critical conditions. Importantly, the system autonomously reverts to the standard transmission frequency when the temperature returns to the normal range, ensuring efficient operation and resource utilization. Overall, this system offers a robust solution for real-time livestock monitoring, optimizing data transmission frequency based on temperature fluctuations to facilitate timely intervention and care.

In an embodiment, in addition to its primary components for livestock tracking, the IoT device is equipped with a magnet designed to activate its functionalities. This magnet serves as a user-friendly mechanism to power on the IoT device, initiating its operations. By holding the magnet near the designated activation area of the IoT device for a brief period, users can easily trigger its functionality without the need for complex procedures or external tools. This activation mechanism enhances the user experience by providing a simple and intuitive way to initialize the device, ensuring quick and convenient deployment in various livestock management scenarios.

In an embodiment, upon activation, the IoT device is programmed to send an SMS and/or email notification to the designated user or users. This notification serves as an alert to inform the user that the IoT device has been activated and is ready for operation. By leveraging SMS and email communication channels, the IoT device ensures timely and reliable delivery of notifications to users, regardless of their location or preferred mode of communication. This feature enhances the user experience by providing immediate feedback upon device activation, allowing users to promptly take action or monitor the device's status. Additionally, the SMS and email notifications enable seamless integration of the IoT device into existing communication workflows, facilitating efficient coordination and decision-making in livestock management operations.

In an embodiment, process of inserting the IoT device into the livestock involves utilizing a tool known as a balling gun. This specialized device is designed to facilitate the safe and efficient administration of boluses or capsules to animals, particularly livestock. To insert the IoT device, the user loads it into the balling gun, ensuring proper alignment and positioning for insertion. With the IoT device securely loaded, the user then approaches the target livestock and administers the bolus using the balling gun. The design of the balling gun allows for controlled and precise delivery of the IoT device into the animal's throat or esophagus, ensuring that it is safely swallowed and positioned within the digestive tract. By utilizing the balling gun for insertion, users can ensure consistent and accurate placement of the IoT device, minimizing the risk of injury to both the animal and the user. Additionally, the use of the balling gun streamlines the insertion process, making it faster and more efficient compared to manual insertion methods.

In an embodiment, the capability for over-the-air reprogramming of the frequency of data transmission represents a significant advancement in the functionality of the IoT device. This feature enables users to remotely adjust and fine-tune the data transmission frequency without the need for physical access to the device. By leveraging wireless communication protocols, such as Wi-Fi or cellular networks, users can initiate reprogramming commands from a centralized management platform or application. Upon receiving the reprogramming command, the IoT device executes the necessary adjustments to the data transmission frequency, ensuring seamless integration with evolving operational requirements or environmental conditions. This flexibility empowers users to optimize the performance of the IoT device in real-time, adapting to changing circumstances or priorities without disruption to livestock monitoring activities. Furthermore, over-the-air reprogramming eliminates the need for manual interventions or on-site visits, reducing operational overhead and enhancing scalability across large-scale livestock management operations.

In an embodiment, the generation of alerts based on temperature transitions signifies a critical aspect of the IoT device's monitoring capabilities, facilitating proactive intervention and decision-making in livestock management. Alerts are triggered when the temperature of the livestock transitions between predefined temperature ranges, including normal to slight high, slight high to high, or pregnancy to normal ranges. These transitions serve as indicators of potential changes in the animal's health status or environmental conditions, warranting attention from the user or livestock caretaker.

When the temperature shifts from normal to slight high, it may signal the onset of mild stress or discomfort in the animal, prompting the generation of an alert to prompt investigation and possible intervention to mitigate any emerging issues. Similarly, transitions from slight high to high temperatures indicate more significant deviations from the norm, potentially signaling the presence of heat stress or illness that requires immediate attention.

Moreover, alerts are also generated when the temperature transitions from pregnancy to normal ranges, indicating the conclusion of the gestation period. This alert serves as a valuable notification for monitoring reproductive cycles and facilitating timely management practices, such as identifying potential calving or breeding opportunities. By generating alerts for these temperature transitions, the IoT device enhances situational awareness and enables timely responses to changes in livestock health and environmental conditions.

In an embodiment, the incorporation of facial recognition capability into the invention represents a significant enhancement in livestock monitoring and management practices. With this feature, the IoT device gains the ability to accurately identify individual animals based on their facial characteristics. Facial recognition technology leverages advanced algorithms to analyze unique facial features such as markings, shapes, and proportions, enabling precise identification and differentiation of livestock within a herd. By deploying facial recognition, the invention offers several key benefits. Firstly, it enables automated and non-intrusive identification of individual animals, eliminating the need for physical tags or manual record-keeping methods. This streamlines livestock management tasks such as tracking health records, monitoring growth rates, and managing breeding programs.

Additionally, facial recognition enhances data accuracy and integrity by associating specific information and metrics with individual animals. This allows for personalized monitoring and tailored management strategies based on the unique needs and characteristics of each animal. For example, health alerts and feeding schedules can be customized to address specific requirements or conditions identified through facial recognition.

In an embodiment, the inclusion of a disease traceability feature in the invention represents a significant advancement in livestock management practices. This feature allows users to accurately locate other livestock within a certain distance of a specified animal, facilitating rapid response and containment measures in the event of disease outbreaks or health concerns. By leveraging this capability, livestock managers can quickly identify and isolate potentially affected animals, minimizing the spread of diseases and reducing the impact on overall herd health. Furthermore, the disease traceability feature enhances overall traceability and monitoring capabilities within livestock operations.

In an embodiment, the distance parameter specified by the user serves as a critical component of the disease traceability feature, allowing users to define the radius within which they wish to locate livestock in relation to a diseased animal. This user-defined parameter enables flexibility and customization in disease management strategies, empowering users to tailor their monitoring and response efforts based on the specific requirements of their operation or the nature of the disease outbreak. By incorporating historical data, the disease traceability feature utilizes past livestock movements and interactions to identify animals within the specified distance of a diseased individual. This historical perspective enhances the accuracy and reliability of the traceability feature, providing users with actionable insights into potential disease transmission pathways and enabling targeted intervention measures to mitigate risks and contain outbreaks effectively.

Furthermore, the IoT device's capability to identify the livestock's reproductive cycle and health status based on temperature data represents a significant advancement in livestock monitoring technology. By analyzing temperature patterns, the device can accurately determine the animal's reproductive stage, such as estrus or pregnancy, as well as detect deviations indicative of health issues or stress. This real-time assessment of reproductive cycles and health status enables timely management interventions, such as optimizing breeding schedules or administering veterinary care, to support overall herd health and productivity. Additionally, by integrating temperature-based health monitoring into the IoT device's functionality, users gain valuable insights into livestock well-being, facilitating proactive management strategies and enhancing animal welfare outcomes in livestock farming operations.

In accordance with an embodiment of the present invention, FIG. 5 illustrates a block diagram of a computer system for executing adaptive monitoring of the livestock. The computer system 500 shown in the figure comprises a processor 502 which serves as the computational engine responsible for executing the instructions stored within the computer-readable non-transitory storage medium. The system further comprises the firmware 502-1 for tracking the health and location of livestock. The firmware 502-1 interacts with the IoT device 502-2, encompassing the necessary hardware components for livestock monitoring. Within the IoT device 502-2, the health and location tracking firmware 502-3 orchestrates the monitoring process, ensuring seamless operation. A specialized module embedded within the firmware is the temperature monitoring and control module 502-4, tasked with monitoring the livestock's temperature and dynamically adjusting the frequency of data transmission based on temperature fluctuations. The temperature monitoring and control module 502-4 plays a pivotal role in ensuring timely and efficient data transmission, optimizing resource utilization while providing real-time monitoring capabilities. Overall, the integrated components within the computer system work in tandem to facilitate effective livestock tracking, enhancing livestock management practices and enabling proactive intervention when necessary.

Some of the non-limiting advantages of the present invention are:

Real-time Monitoring: The invention provides real-time monitoring of livestock health and location, allowing for immediate detection of any abnormalities or health concerns, enabling prompt intervention and treatment.

Adaptive Data Transmission: By dynamically adjusting the frequency of data transmission based on livestock temperature, the invention optimizes communication efficiency, ensuring that critical information reaches livestock managers promptly and accurately.

Non-invasive Implementation: Unlike traditional monitoring methods that may involve invasive procedures or attachments, the invention offers a non-invasive solution, minimizing stress and discomfort for the animals while still providing comprehensive monitoring capabilities.

Enhanced Management Features: In addition to temperature-based monitoring, the invention incorporates advanced features such as facial recognition for livestock identification and disease traceability, empowering livestock managers with comprehensive tools for efficient management and disease control.

Terms and phrases used in this document, and variations thereof, unless otherwise expressly stated, should be construed as open-ended as opposed to limiting. As examples of the foregoing: the term "including" should be read as mean "including, without limitation" or the like; the term "example" is used to provide exemplary instances of the item in the discussion, not an exhaustive or limiting list thereof, and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount, or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the subject matter of the present invention. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

All publications, patent applications, patents, and other references mentioned in the specification are indicative of the level of those skilled in the art to which the presently disclosed subject matter pertains. All publications, patent applications, patents, and other references are herein incorporated by reference to the same extent as if each individual publication, patent application, patent, and other reference was specifically and individually indicated to be incorporated by reference. It will be understood that, although a number of patent applications, patents, and other references are referred to herein, such reference does not constitute an admission that any of these documents forms part of the common general knowledge in the art. Although the foregoing subject matter has been described in some detail by way of illustration and example for purposes of clarity of understanding, it will be understood by those skilled in the art that certain changes and modifications can be practiced within the scope of the appended claims.

What is claimed is:

1. A firmware system for an IoT device for tracking health and location of livestock, comprising:
monitoring temperature of the livestock;
adjusting the frequency of data transmission based on the temperature of the livestock, wherein:
when the temperature is in the normal range, data is sent once per hour;
when the temperature is above the normal range, data is sent every 30 minutes;
when the temperature is in the high range, data is sent every 15 minutes;
automatically reverting to sending data once per hour when the temperature returns to the normal range.

2. The firmware system of claim 1, wherein the IoT device further comprises a magnet used to activate the IoT device.

3. The firmware system of claim 1, wherein the IoT device sends an SMS and/or email notification to the user upon activation.

4. The firmware system of claim 1, wherein the IoT device is inserted into the livestock using a balling gun.

5. The firmware system of claim 1, wherein the frequency of data transmission is reprogrammable over-the-air.

6. The firmware system of claim 1, wherein alerts are generated when the temperature transitions between normal and slight high, slight high and high, or pregnancy and normal ranges.

7. The firmware system of claim 1, further comprising facial recognition capability to identify individual livestock.

8. The firmware system of claim 1, further comprising disease traceability feature to locate livestock within a certain distance of a specified animal.

9. The firmware system of claim 8, wherein the distance is specified by a user-defined parameter.

10. The firmware system of claim 8, wherein the disease traceability feature utilizes historical data to identify livestock within the specified distance of a diseased animal.

11. The firmware system of claim 8, wherein the disease traceability feature provides search results within a predetermined radius of a specified livestock.

12. The firmware system of claim 1, wherein the IoT device identifies the livestock's reproductive cycle and health status based on the temperature data.

13. A computer-readable non-transitory storage medium containing instructions executable by a processor of an IoT device configured to track the health and location of livestock, the instructions comprising:
monitoring temperature of the livestock;
adjusting the frequency of data transmission based on the temperature of the livestock, wherein:
when the temperature is in the normal range, data is sent once per hour;
when the temperature is above the normal range, data is sent every 30 minutes;
when the temperature is in the high range, data is sent every 15 minutes;
automatically reverting to sending data once per hour when the temperature returns to the normal range.

14. A method for monitoring the health and location of livestock using an IoT device equipped with firmware, comprising:
monitoring temperature of the livestock;
adjusting the frequency of data transmission based on the temperature of the livestock, wherein:
when the temperature is in the normal range, data is sent once per hour;
when the temperature is above the normal range, data is sent every 30 minutes;
when the temperature is in the high range, data is sent every 15 minutes;
automatically reverting to sending data once per hour when the temperature returns to the normal range.

15. The method of claim 14, further comprising activating the IoT device by holding a magnet next to a bolus for a predetermined duration.

16. The method of claim 14, further comprising sending an SMS and/or email notification upon activation of the IoT device.

* * * * *